(12) United States Patent
Kinrot (10) Patent No.: US 6,574,193 B1
(45) Date of Patent: Jun. 3, 2003

(54) CONGESTION CONTROL USING VARIABLE RATE ENCODING BASED ON QUEUE FILL

(75) Inventor: Uri Kinrot, Hod Hasharon (IL)

(73) Assignee: Veraz Networks Ltd., Petach-Tikva (IL)

(*) Notice: Subject to any disclaimer, the term of this patent is extended or adjusted under 35 U.S.C. 154(b) by 0 days.

(21) Appl. No.: 09/362,844

(22) Filed: Jul. 28, 1999

(51) Int. Cl.[7] .............................. H04J 1/16; H04J 3/14; H04L 1/00
(52) U.S. Cl. .................. 370/229; 370/395.64; 370/412
(58) Field of Search ................................. 370/229–235, 370/412, 395.1, 395.42, 395.43, 395.64

(56) References Cited

U.S. PATENT DOCUMENTS

| | | | |
|---|---|---|---|
| 5,313,454 A | * 5/1994 | Bustini | 370/13 |
| 5,463,620 A | 10/1995 | Sriram | 370/60 |
| 5,566,208 A | * 10/1996 | Balakrishnan | 375/240 |
| 5,594,729 A | 1/1997 | Kanakia et al. | |
| 5,646,943 A | 7/1997 | Elwalid | 370/230 |
| 5,805,577 A | 9/1998 | Jain et al. | 370/234 |
| 5,812,526 A | * 9/1998 | Chang et al. | 370/230 |
| 6,067,303 A | * 5/2000 | Aaker | 370/474 |
| 6,185,736 B1 | * 2/2001 | Ueno | 725/95 |
| 6,219,339 B1 | * 4/2001 | Doshi | 370/235 |
| 6,370,144 B1 | * 4/2002 | Chao | 370/395.42 |

OTHER PUBLICATIONS

ITU Standard I.363.2, "B–ISDN ATM Adaptation Layer Specification: Type 2 AAL". Sep. 1997.
ITU Standard I.366.2, "AAL Type 2 Service Specific Convergence Sublayer for Trunking". Feb. 1999.
K. Sriram, "Methodologies for Bandwidth Allocation, Transmission Scheduling, and Congestion Avoidance in Broadband ATM Networks." Computer Networks and ISDN Systems, vol. 26, pp. 43–59, (1993).

* cited by examiner

Primary Examiner—Ajit Patel
Assistant Examiner—Chirag Shah
(74) Attorney, Agent, or Firm—Abelman, Frayne & Schwab (57) ABSTRACT

Variable-rate encoding apparatus operative to receive data and process the data for transmission through an asynchronous transfer mode network. A processor determines a degree of circuit congestion associated with at least one virtual circuit of the network. A variable-rate encoder encodes the received data so as to provide encoded data packets to the at least one virtual circuit at a rate that is selected responsive to the degree of circuit congestion. An ambiguity resolving field is preferably added to at least some of the data packets so as to resolve ambiguity regarding encoding rate.

31 Claims, 4 Drawing Sheets

CONGESTION CONTROL USING VARIABLE RATE ENCODING BASED ON QUEUE FILL

FIELD OF THE INVENTION

The present invention relates generally to communication networks, and specifically to transmission of audio data in ATM networks.

BACKGROUND OF THE INVENTION

Asynchronous Transfer Mode (ATM) has been widely accepted as a packet switching communications standard for high-speed, Broadband Integrated Services Digital Networks (B-ISDN). ATM networks are designed to carry a mixture of data, voice and video on common circuits. An ATM packet, or cell, comprises 53 bytes, including a five-byte header and 48-byte payload.

The International Telecommunications Union (ITU) has promulgated standard I.363.2, "B-ISDN ATM Adaptation Layer Type 2 Specification" (September, 1997), known as AAL-2, in order to enable efficient transmission of real-time voice-band data over ATM networks. The standard, which is incorporated herein by reference, defines how traffic in the form of packets of various numbers of octets (or bytes) are assembled into ATM cell payloads at a transmitter and disassembled back into the original packet stream at the receiver.

ITU standard I.366.2, "AAL Type 2 Service Specific Convergence Sublaver for Trunking," which is incorporated herein by reference, defines several types of packet formats for voice-band data, which are encoded into packets of variable length. A Type-1 packet, as defined by this standard, has no explicit identifier for the encoding algorithm used. The encoding algorithm is implicitly identified, however, by a combination of the packet length, a parameter in the packet header (a user-user interface code, or UUI), and a predefined profile agreed upon between the transmitter and the receiver. The standard identifies the profile as "a mapping that informs the receiver of a Type-1 audio packet how to interpret the packet content. The domain of this mapping is a set of pairs (UUI, Length)." The first element of each pair is a UUI codepoint in the range 0–15, which is utilized in part to indicate a packet sequence number. The second element is the packet length for one of the encoding formats included in the profile. Each Type-1 packet may include multiple encoded packets, or sub-packets.

Each encoding algorithm produces some minimum encoded packet length, dependent on the encoding bit rate. For example, packets encoded using the LD-CELP algorithm, in accordance with standard G.728 of the ITU, have minimum packet lengths of 10, 8 and 6 octets, respectively, for bit rates of 16, 12.8 and 9.6 Kbit/s, at which the LD-CELP algorithm is conventionally allowed to work. A profile may also include a combination of encoded packets with more than one minimum length interval, if no ambiguity occurs as a result. Thus, for example, the profile may include LD-CEL encoded packets of lengths 20, 16 and 12 octets. Part of the UUI field may be used to expand the profile if ambiguity does occur. The cost of expanding the number of bits allocated to the profile is that the modulus of the packet sequence number, which is used to detect irregularities in the packet stream at the receiving end, is reduced.

The alternative packet lengths and corresponding bit rates of a given encoding scheme may be used for controlling traffic rate at the input to an ATM network from a transmission source. This technique is known generally as variable rate encoding (VRE). The ITU defines VRE for use in voice transmission over ATM network as "the capability of the encoding algorithm to dynamically switch between the nominal bit rate to lower or higher discrete bit rates under the control of the ATM equipment."

How VRE is Performed depends on the signal type, for example, speech, fax or modem, and the kind of encoding algorithm used, such as the ADPCM, LD-CELP or CS-ACELP algorithms, for example, which are defined by the ITU G. 726, G.728 and G.729 standards, respectively. For each particular signal type and algorithm, there is a set of applicable, discrete output bit rates, such as the LD-CELP rates of 9.6, 12.8 and 15 Kbit/s mentioned above. A VBD-modem signal, as defined by the G.726 standard, is commonly encoded at 40 Kbit/s. Typically, VRE on speech signals is performed by selecting among the applicable bit rates. Another option, useful for fax signals with forward error correction (FEC), for example, is to change the bit rate by using or not using additional FEC bits.

The use of VRE is generally required in the following situations:

When the traffic load in a specific ATM Virtual Circuit (VC) is higher than the bandwidth allowed by contract with the network being used; or When the sum of the traffic loads in all of the VC's that share a common link exceeds the link bandwidth.

Both of these conditions may occur simultaneously. There is also the possibility that traffic load on a given Virtual Path (VP, as defined by the ITU and ATM Forum), which serves a number of VC's, mav exceed a contractual bandwidth.

U.S. Pat. No. 5,646,943, to Elwalid, which is incorporated herein by reference, describes a congestion control method in which an access regulator limits the rate of input data to a network node. A rate parameter of the access regulator is dynamically adjusted according to a level of congestion in the node.

U.S. Pat. No. 5,805,577, to Jain, et al., which is incorporated herein by reference, similarly describes a congestion avoidance scheme for data traffic in ATM networks. Input data rates from a number of active sources transmitting data via a network switch are measured and used to determine an overload factor relative to available bit rate capacity. The overload factor is used to dynamically determine a fair share allocation of transmission capacity among the sources. The transmission rates of the sources are adjusted so as not to exceed the respectively allocated capacity. This scheme is complex and computationally heavy, since it requires that the input data rates be measured, and that all of the queues associated with the data sources be viewed and taken into account.

U.S. Pat. No. 5,463,620, to Sriram, and an article by Sriram entitled "Methodologies for Bandwidth Allocation, Transmission Scheduling, and Congestion Avoidance in Broadband ATM Networks," in *Computer Networks and ISDN Systems* 26 (1993), pp. 43–59, which are incorporated herein by reference, describe a congestion control mechanism using bit-dropping of packetized voice data. When congestion occurs, traffic loads is reduced by dropping the least-significant bits of already-encoded voice packets.

SUMMARY OF THE INVENTION

It is an object of the present invention to provide an improved method for congestion control in ATM networks.

It is a further object of some aspects of the present invention to provide a method for congestion control that is particularly applicable to voice-band data utilizing the AAL-2 standard.

In preferred embodiments of the present invention, one or more variable-rate encoders generate encoded data for transmission via a virtual circuit (VC) over an ATM network. A degree of circuit congestion, or stress, is determined, based on a level of congestion of the network encountered by the VC. The stress level is fed back to the encoders, which vary their encoding rates responsive thereto, so as to adjust their output bit rate to the congestion level.

In some preferred embodiments of the present invention, the encoded data are assembled into cells, preferably using an AAL-2 service, as is known in the ATM art. The cells enter a cell queue for transmission via the VC. A fill level of the cell queue, i.e., an expected length of the queuing delay, is used to determine the stress level for controlling the encoding rates of the encoders.

In some preferred embodiments of the present invention, a plurality of VC's, each with its own cell queue, are multiplexed over a network link. The stress level for each VC, as well as the corresponding encoding rates of the one or more encoders associated with the VC, is determined substantially independently for each of rune VC's. Mutual influence among the VC stress levels is felt indirectly, however, when network bandwidth limitations cause some or all of the VC cell queues to lengthen as a result of the aggregate input traffic level of all the VC's.

In some preferred embodiments of the present invention, the output bit rate of the one or more encoders is reduced below a nominal, maximal value even when the stress level is low. Preferably, the reduction is implemented statistically, i.e., a reduced encoding rate is used intermittently, at statistically-determined intervals. The reduced bit rate enables a constant, although mildly reduced, voice transmission quality level to be maintained, generally independent of network load. It also reduces the VC bandwidth requirement, enabling a user of the VC to save on network contract costs and/or to use available bandwidth for transmission of additional data, typically non-real time data, such as electronic mail. Further preferably, statistical control of the encoding rate is maintained under both congested and non-congested network conditions, so that the transition from one condition to the other is smooth, without an abrupt change in transmission quality.

In some preferred embodiments of the present invention, an ambiguity-resolving field (ARF), preferably one octet in length, is attached to the head or tail of a packet for transmission. Using the ARF, an AAL-2 Type-1 profile is expanded so as to identify the lengths of sub-packets contained in the packet, which would otherwise be ambiguous. Preferably, a part of the ARF is used for error detection and correction of the ARF itself, using a CRC-3 code, for example. The ARF allows the limited range of Type-1 profiles to be substantially expanded, so that a greater variety of sub-packet sizes can be used in a single packet. As a result, successive sub-packets output by an encoder and grouped in a single Type-1 packet can have different lengths, unlike Type-1 packets known in the art. The encoding rate can thus be varied at a higher frequency than would be possible if only ordinary Type-1 profiles were used.

There is therefore provided, in accordance with a preferred embodiment of the present invention, variable-rate encoding apparatus operative to receive data and process the data for transmission through an asynchronous transfer mode network, including:

a processor, which determines a degree of circuit congestion associated with at least one virtual circuit of the network; and a variable-rate encoder, operative to encode the received data so as to provide encoded data packets to the at least one virtual circuit at a rate that is selected responsive to the degree of circuit congestion.

Preferably, the degree of the circuit congestion is determined responsive to the status of a cell queue associated with the at least one virtual circuit, wherein the degree of the circuit congestion is proportional to a ratio of an instantaneous fill level of the cell queue to a maximum fill level of the cell queue.

Further preferably, the processor determines a mean bit rate of the encoded data packets to be output by the encoder as a function of the circuit congestion, and including a bit rate selector, which selects one of a plurality of discrete, applicable bit rates of the encoder responsive to the mean bit rate. Most preferably, each of the applicable bit rates is respectively associated with an output data packet length determined by an encoding standard according to which the encoder encodes the data. Further preferably, the mean bit rate determined for a minimum value of the circuit congestion is less than a maximum of the applicable bit rates. In a preferred embodiment, for a given mean bit rate, the bit rate selector alternately selects at least two different ones of the applicable bit rates, wherein the selection among the at least two different applicable bit rates is randomized.

Preferably, the rate at which the encoder encodes the data is selected responsive to an optimal average number of output bits per data sample, which is determined independently of the circuit congestion. Most preferably, the processor determines a desired bit rate of the encoded data packets to be output by the encoder by comparing a mean bit rate determined as a function of the circuit congestion and an optimal bit rate determined as a function of the optimal average number of output bits per data sample.

In a preferred embodiment, the apparatus generates ATM Adaptation Layer 2 Type-1 packets for transmission through the network, including a Type-1 packet in which two or more of the encoded data packets, differing in at least one defining characteristic, are combined. Preferably, an ambiguity-resolving field is appended to at least one of the Type-1 packets so as to identify the characteristics of the encoded data packets combined therein.

There is further provided, in accordance with a preferred embodiment of the present invention, a variable-rate encoding system for processing data received from multiple data sources for transmission through an asynchronous transfer mode network, including:

one or more cell queues, which contain cells prepared for transmission through respective virtual circuits or virtual paths of the network and have respective queue fill levels; and one or more variable-rate encoders, each of which provides encoded data packets to one of the cell queues after encoding the data at a rate that is varied responsive to the fill level of the cell queue to which the packets are provided.

Preferably, the one or more cell queues include a plurality of cell queues, whose respective fill levels vary responsive to a level of network congestion. Most preferably, the encoding rate for each of the encoders is set responsive to the level of the one of the plurality of cell queues to which the encoder provides the encoded data packets, substantially independently of setting the encoding rate of the other encoders.

There is additionally provided, in accordance with a preferred embodiment of the present invention, variable-rate encoding apparatus for processing data received for transmission through an asynchronous transfer mode network, including a variable-rate encoder, which encodes the received data so as to provide encoded data sub-packets having different encoding characteristics, the encoder being operative to combine two or more of the sub-packets into a Type-1 packet, and to attach an ambiguity-resolving field to the Type-1 packet when required so as to identify the encoding characteristics of the sub-packets contained in the packet.

Preferably, the different encoding characteristics include respective lengths of the sub-packets, wherein the Type-1 packet includes two or more sub-packets of different lengths. Further preferably, the different lengths are associated with respective, different encoding rates, which are selected from a plurality of discrete, applicable bit rates of the encoder.

In a preferred embodiment, the different encoding characteristics include different encoding rules that are applied by the encoder.

There is moreover provided, in accordance with a preferred embodiment of the present invention, a method for variable-rate encoding of data from a data source for transmission through a virtual circuit in an asynchronous transfer mode network, including:

encoding data from the source so as to provide encoded data packets to the virtual circuit at a variable output bit rate;

determining a degree of circuit congestion associated with the virtual circuit; and controlling the encoding so as to set the output bit rate responsive to the degree of circuit congestion.

Preferably, determining the degree of circuit congestion includes assessing the status of a cell queue associated with the virtual circuit, wherein assessing the status of the cell queue includes evaluating a ratio of a fill level of the cell queue to a maximum fill level of the cell queue.

Further preferably, controlling the encoding includes determining a mean bit rate of the encoded data packets to be output as a function of the circuit congestion, and selecting one of a plurality of discrete, applicable bit rates responsive to the mean bit rate. Most preferably, selecting the one of the applicable bit rates includes selecting an output data packet length associated with the respective bit rate, as determined by an applicable encoding standard. Further preferably, determining the mean bit rate includes setting a mean bit rate at a minimum value of the circuit congestion that is substantially less than a maximum of the applicable bit rates.

In a preferred embodiment, selecting the one of the applicable bit rates includes, for a given mean bit rate, alternately selecting at least two different ones of the applicable bit rates, wherein alternately selecting the at least two different applicable bit rates includes making a randomized selection.

Preferably, controlling the encoding includes selecting a rate at which the data are encoded responsive to an optimal average number of output bits per data sample, which is determined independently of the circuit congestion. Most preferably, selecting the rate at which the data are encoded includes selecting a rate based on comparing a measured mean bit rate and an optimal bit rate determined as a function of the optimal average number of output bits per data sample.

In a preferred embodiment, the method includes combining two or more encoded data packets differing in at least one defining characteristic thereof into a single ATM Adaptation Layer 2 Type-1 packet for input to the virtual circuit. Preferably, combining the two or more encoded data packets includes appending an ambiguity-resolving field to the Type-1 packet so as to identify the characteristics of the encoded data packets combined therein.

Preferably, encoding the data includes encoding data from multiple sources for transmission through a plurality of virtual circuits in the network, each circuit characterized by a respective circuit congestion dependent on congestion of the network, and controlling the encoding includes varying an output bit rate of each of the sources substantially independently of the other sources. Most preferably, varying the output bit rate of each of the sources includes varying a bit rate responsive to a fill level of a cell queue associated with a respective one of the virtual circuits to which the encoded data from the source are provided.

There is further provided, in accordance with a preferred embodiment of the present invention, a method for variable-rate encoding of data from a data source for transmission through an asynchronous transfer mode network, including:

encoding data from the source so as to provide encoded data sub-packets having different encoding characteristics;

combining one or more of the sub-packets in an ATM Adaptation Layer 2 Type-1 packet; and attaching an ambiguity-resolving field to the Type-1 packet so as to identify the encoding characteristics of the one or more sub-packets contained in the packet.

Preferably, encoding the data includes providing sub-packets having different, respective lengths, wherein combining the sub-packets includes combining sub-packets of different lengths.

Additionally or alternatively, encoding the data includes encoding data at different encoding rates, which are selected from a plurality of discrete, applicable bit rates of the encoder.

In a preferred embodiment, encoding the data includes applying different encoding rules to the sub-packets.

The present invention will be more fully understood from the following detailed description of the preferred embodiments thereof, taken together with the drawings in which:

DETAILED DESCRIPTION OF PREFERRED EMBODIMENTS

Figure 1:
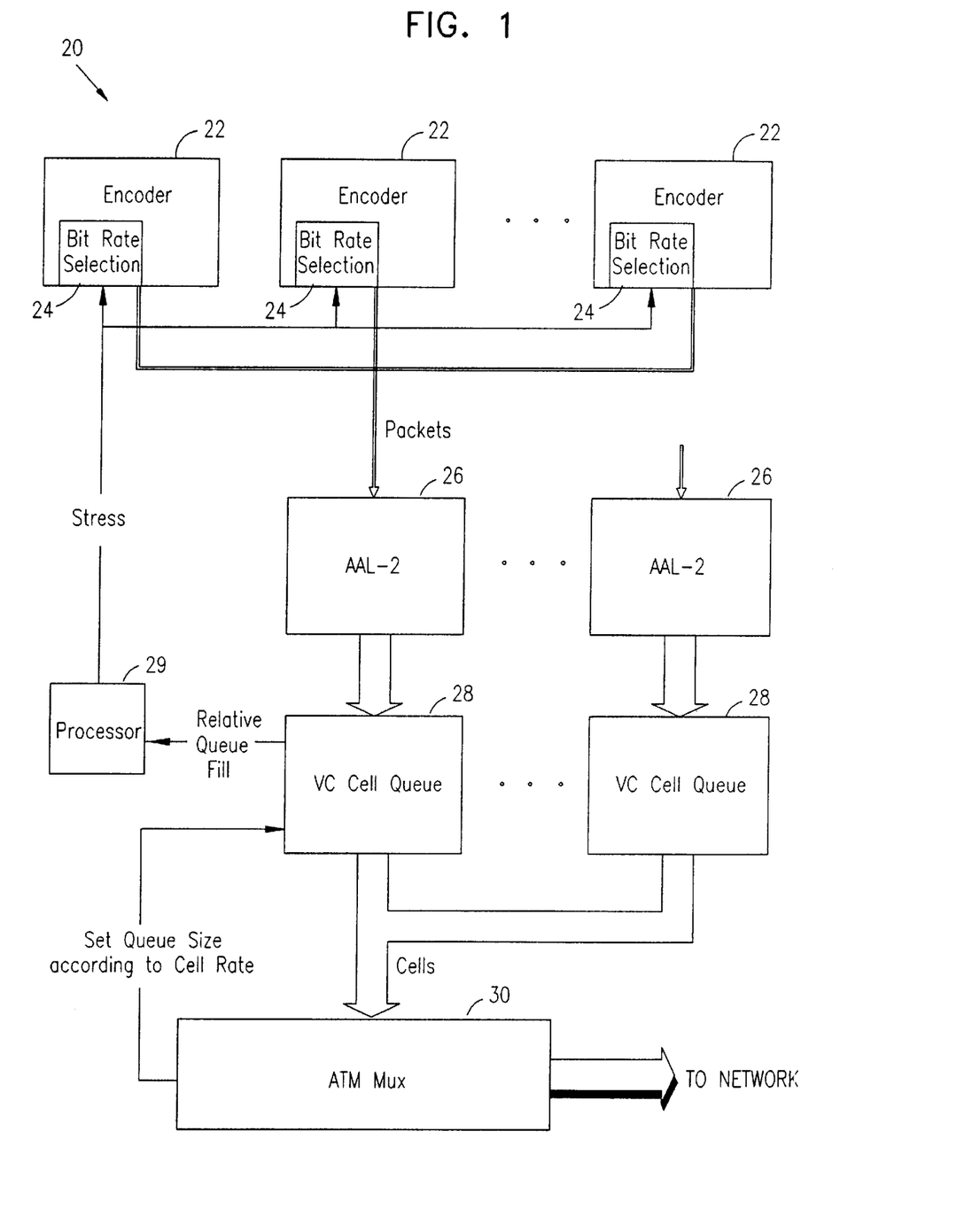
FIG. 1 is a schematic block diagram illustrating a system for encoding and transmission of data over an ATM network, in accordance with a preferred embodiment of the present invention.

FIG. 1 is a schematic block diagram illustrating a data encoding and transmission system 20 for an ATM network, based on feedback-controlled, variable-rate encoding (VRE), in accordance with a preferred embodiment of the present invention. One or more encoders 22 receive input data, typically audio data based on voice input, which they encode for transmission. The encoding may employ any suitable algorithm known in the art, such as LD-CELP or ADPCM, having a number of applicable bit rates. The bit rate for each encoder is selected by a respective bit rate selector 24. Typically, selection of the applicable bit rate also determines the length of encoded data packets output by the encoder.

The encoded data packets from encoders 22 are received by an AAL-2 stage 26, which groups the encoded packets into ATM cells, in accordance with ATM standards. The ATM cells are loaded into a VC cell queue 28. Typically, multiple AAL-2 stages 26 and VC cell queues 28, each with their own multiple input data sources and encoders 22, operate in parallel. The outputs of all of the cell queues are fed by an ATM multiplexer 30 to the network for transmission via respective VC's. The cell queue length, or fill, in each of queues 28 varies as a function of the cell input rate to the particular queue from its respective encoders 22, and of the individual and collective cell output rate from multiplexer 30. Thus, the length of all of the cell queues typically grows when network congestion increases, whereas an increase in the output bit rate of one or more of encoders 22 directly affects only its own queue. The bit rates of the encoders are controlled by a processor 29 using feedback relating to the length of the respective queue, as described hereinbelow.

Figure 2:
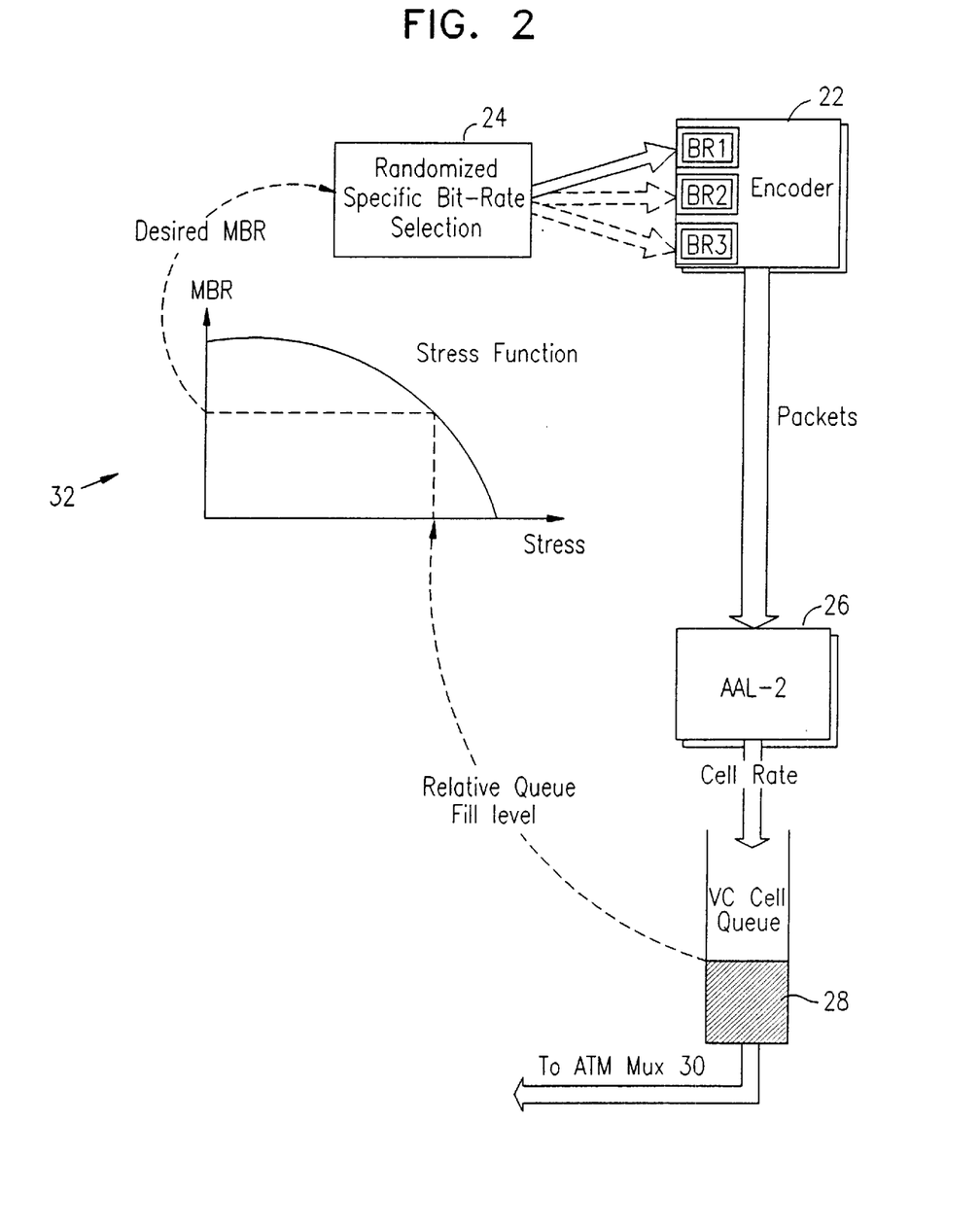
FIG. 2 is a schematic block diagram showing details of the system of FIG. 1, illustrative of a method of variable rate encoding control, in accordance with a preferred embodiment of the present invention.

FIG. 2 is a schematic block diagram showing details of system 20, in order to illustrate a method for feedback control of the bit rate of encoders 22, in accordance with a preferred embodiment of the present invention. The relative fill level of queue 28 is used by processor 29 (FIG. 1) as a measure of circuit congestion, which is input to a stress function, illustrated by a graph 32 in FIG. 2. This function is used to determine a desired mean bit rate (MBR) of each encoder 22, which typically decreases as the circuit congestion, or stress, increases. When the MBR of the encoder is reduced, fewer cells are added to queue 28, so that the queue delay is similarly reduced. Likewise, when the queue delay is short, the MBR can be increased to take greater advantage of available bandwidth. The MBR determined by the stress function is input to selector 24, which accordingly selects one of the applicable bit rates of encoder 22, labeled BR1, BR2 and BR3 in the present example. Preferably, the selection made by selector 24 of each encoder 22 is randomized over time, so that the selected bit rates vary statistically about the MBR. Selector 24 may be a part of encoder 22, or alternatively may be implemented in processor 29.

The circuit stress is preferably a dimensionless variable, equal to the ratio of the actual fill level of queue 28 to a maximum fill level of the queue. This maximum fill level is given by the product of the parameters cell_rate and max_delay. The cell_rate parameter is a minimum assured cell exhaust rate from the cell queue, which is received from ATM multiplexer 30. It takes into account network contracts, link bandwidth and possibly system limitations. The max_delay parameter is the maximum allowed queuing delay, based on the connection requirements of the VC. Preferably, the maximum fill level is reset whenever there is a change in either the cell_rate or max_delay. This maximum fill level is also called the queue size. The stress is thus indicative of the ratio of the present maximum expected queue delay to she maximum allowed delay. If the actual cell exhaust rate is greater than the minimum guaranteed rate, then the ratio of the actual delay to the maximum allowed delay will be less than the stress ratio, but the method described hereinabove will continue to operate satisfactorily notwithstanding.

Figure 3:
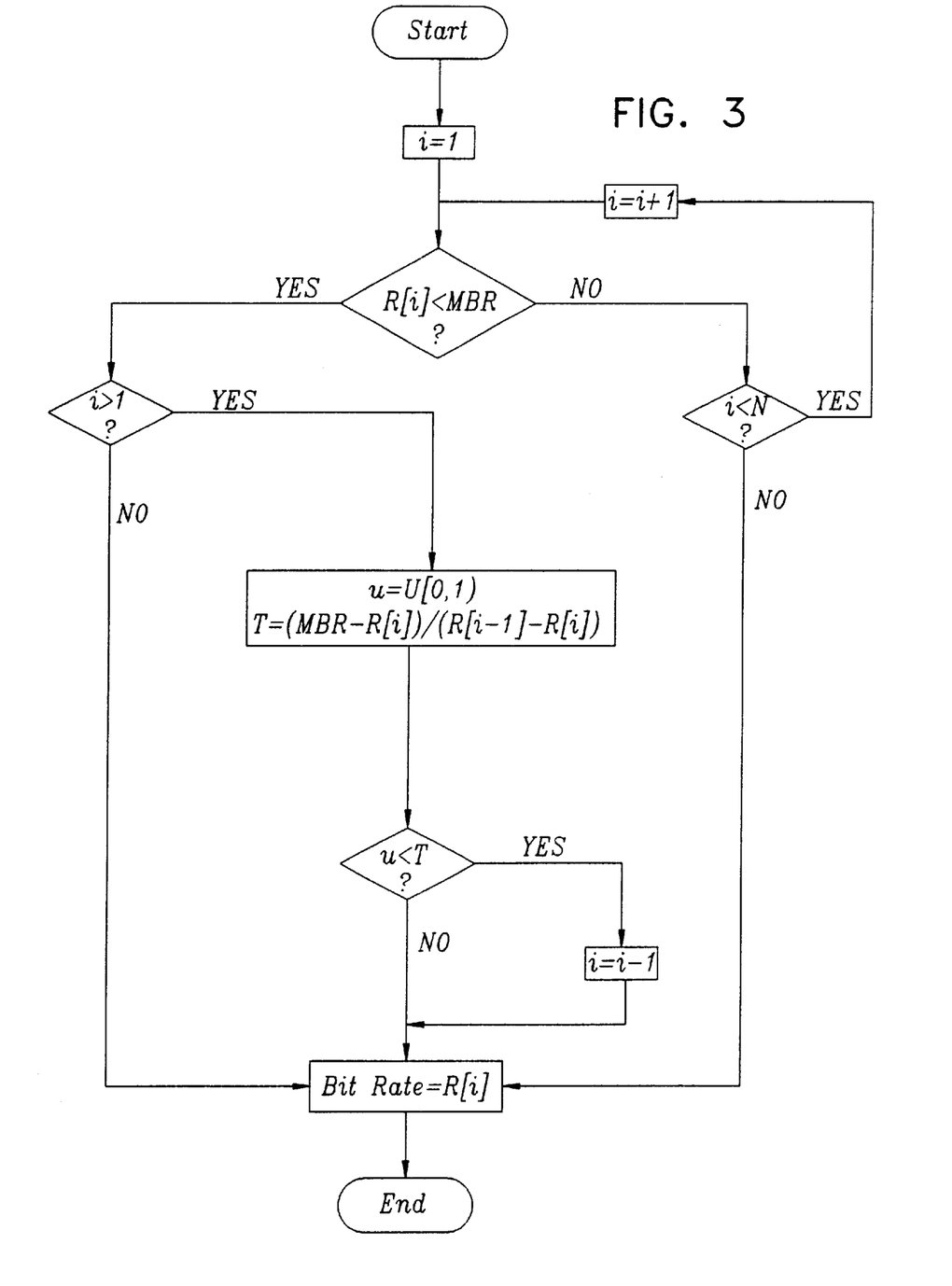
FIG. 3 is a flow chart that schematically illustrates a method for selecting a variable encoding rate, in accordance with a preferred embodiment of the present invention.

FIG. 3 is a flow chart that schematically illustrates a method for randomization of the bit rate selected by each individual selector 24, based on the determined MBR, in accordance with a preferred embodiment of the present invention. For the purposes of this method, each of selectors 24 in system 20 has its own uniform random number generator, represented here as U[0,1], which generates random numbers over the interval [0,1]. The applicable bit rates for any one of encoders 22 are represented as an array of N values R[1], . . . , R[N], arranged in a descending order.

A test encoder bit rate is initially set to its maximum bit rate value, which is compared with the MBR. If the bit rate is less than the MBR, then the maximum bit rate is maintained so long as the MBR does not change. Otherwise, the test encoder bit rate is decremented until it is less than the MBR, or until the minimum encoder bit rate (R[N]) is reached. When the test encoder bit rate is less than both the MBR and the maximum encoder bit rate (i>1), a parameter T is computed, equal to the ratio of the difference between the MBR and the test bit rate to the difference between the next higher encoder bit rate and the current bit rate. T is compared to a random number u, generated by the random number generator U[0,1]. If u<T, then the next higher encoder bit rate is selected. Otherwise, the test bit rate is selected.

This procedure is repeated at predetermined intervals, with the result that the actual encoder bit rate that is used is distributed statistically above and below the MBR. The encoding rate is thus set so as to take maximal advantage of the bandwidth that is allocated to the particular transmission source served by encoder 22, based on the circuit stress. If the encoding rate were to remain at all times at a value R[i]<MBR, some of this bandwidth would be wasted. Furthermore, because of the statistical variation of the encoding rate, changes in the MBR that may occur as a result of varying network congestion or bursts of data entering one of encoders 22 do not cause a sudden, disturbing change in voice quality.

Figure 4:
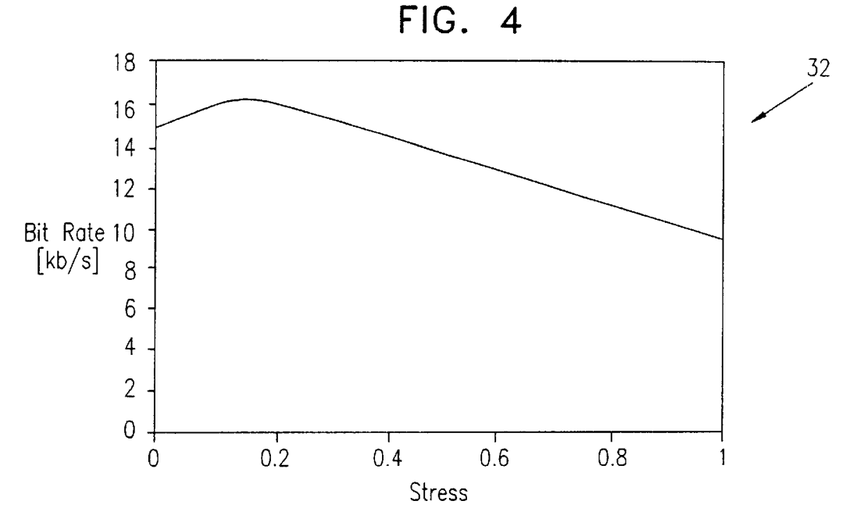
FIG. 4 is a graph illustrating a stress function, for use in setting a variable encoding rate, in accordance with a preferred embodiment of the present invention.

FIG. 4 is a graph showing a stress function 32, in accordance with another preferred embodiment of the present invention. In this case, when there is little or no circuit stress, for example, at stress values less than about 0.2, the MBR is reduced. An advantage of this reduction is that it frees bandwidth for other traffic, such as electronic mail and other non-real-time data. It can also help to relieve congestion in other, busier channels and may thus avoid delay or congestion of an entire network link. The actual function curve is arrived at by simulation, analysis and/or experiment, with improvements being generated against a straight-line function from the maximum bit rate to full queue points.

Figure 5:
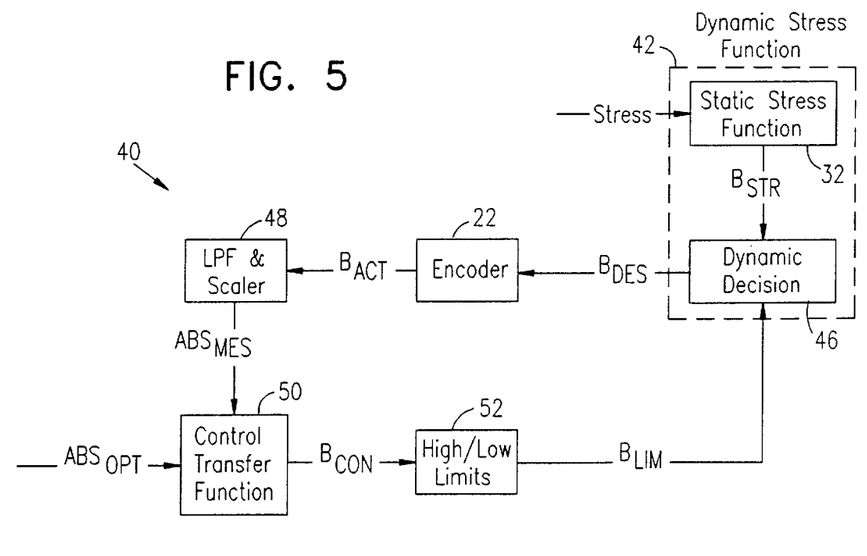
FIG. 5 is a block diagram that schematically illustrates a control loop used in determining a variable encoding rate, in accordance with a preferred embodiment of the present invention.

FIG. 5 is a block diagram that schematically illustrates a control loop 40 for dynamically varying the encoding rate of encoder 22, in accordance with still another preferred embodiment of the present invention. In this case, a desired bit rate $B_{DES}$ is generated by a dynamic stress function 42, so that the average bit rate output by the encoder is generally constant over time in both congested and non-congested situations.

For the purposes of loop 40, an average number of bits per sample ABS is defined as the number of bits used to convey the information in each sample generated by a transmission source, typically a source of standard digitized speech coding at 8000 samples/second. An optimal average number of bits per sample $ABS_{OPT}$ is determined based on an appropriate trade-off of cost against quality. A real-time, measured value of the average number of bits per sample $ABS_{MES}$ is found by applying a low-pass filter and scaler 48 to the actual output bit rate $B_{ACT}$ of encoder 22. A control transfer function 50, as is known in the art of proportional integral differential (PID) control loops, for example, compares $ABS_{OPT}$ to $ABS_{MES}$ and outputs a control bit rate value $B_{CON}$. The objective of function 50 is to maintain the actual ABS of the encoder over time as close as possible to $ABS_{OPT}$. Normally, $B_{CON}$ is high when $ABS_{MES}<ABS_{OPT}$, and low when $ABS_{OPT}<ABS_{MES}$. A limiter 52 applies high and low limits to $B_{CON}$ in order to restrict it to a range of values appropriate to the applicable bit rates of encoder 22. The result is a parameter $B_{LIM}$, representing the instantaneous correction needed to achieve the objective of loop 40, namely $ABS_{OPT}$.

A dynamic decision block 46 compares $B_{LIM}$ to a stress-based target bit rate $B_{STR}$, which is generated by stress function 32, as described hereinabove with reference to the MBR. Block 46 outputs a desired bit rate $B_{DES}$ based on both of the target inputs, wherein a convenient choice is $B_{DES}=\min(B_{LIM},B_{STR})$. When network traffic is light, so that the stress is low, this function gives $B_{DES}=B_{LIM}$, so that the average bit rate is controlled by loop 40. In conditions of heavy congestion, the stress is high, and $B_{DES}=B_{STR}$. In intermediate conditions, both of the control paths may be active simultaneously.

When the network is congested, it is important that loop 40 have high bandwidth, so that after $B_{DES}$ is depressed by a peak in stress, it can increase quickly thereafter when the stress is relieved. In this way, encoder 22 can be controlled to make optimal use of bandwidth available on the corresponding VC, so that the actual ABS over time is as close as possible to $ABS_{OPT}$, and good voice quality is constantly maintained. The speed at which the encoding rate can be changed, however, is limited by the fact that conventional Type-1 AAL-2 packets can accept only certain, limited groupings of sub-packets of different lengths.

Figure 6:
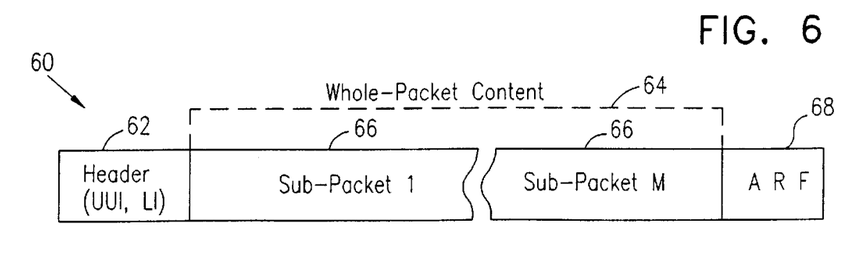
FIG. 6 is a block diagram that schematically illustrates the structure of a data packet including an ambiguity-resolving field, in accordance with a preferred embodiment of the present invention.

FIG. 6 is a block diagram that schematically illustrates a modified Type-1 packet 60, having an ambiguity-resolving field (ARF) 68, in accordance with a preferred embodiment of the present invention. As described hereinbelow, ARF 68 enables packet 60 to accept a wider variety of groupings of different-length sub-packets than can a conventional Type-1 packet, so that a higher VRE control bandwidth can be achieved.

Packet 60 comprises a three-octet header 62, in accordance with the AAL-2 standard, including UUI and length indicator (LI) fields. Most of packet 60 is filled with content, or payload, 64, which comprises M sub-packets 66 (i.e., sub-packets 1 through M), each containing encoded data. ARF 68 preferably comprises an additional data byte, attached to the tall of packet 60, although it may alternatively be at the head. Preferably, five bits of ARF 68 comprise information used to expand the UUI codepoint, and the remaining three bits are used for error checking and/or correction of the information portion of the ARF, using a standard CRC code, for example. The five bits of ARF information allow a single UUI codepoint to be expanded into 32 different entries.

Table I below presents an example illustrating the expansion of available Type-1 profiles using ARF 68, in accordance with a preferred embodiment of the present invention. This example pertains to adaptive differential pulse code modulation (ADPCM) coding, in accordance with the ITU G.726 standard. Ordinarily, this type of coding has applicable packet sizes of 10, 15 and 20 octets, at respective bit rates of 16, 24 and 32 Kbit/s. Using conventional Type-1 profiles, a packet at the lowest bit rate containing two sub-packets of the minimum, 10-octet size cannot be distinguished from a packet containing a single 20-octet sub-packet, and is therefore normally forbidden.

In Table I, the ARF is used to add a single codepoint. The content of the ARF indicates the expanded codepoint and is only used when needed. As noted above, M represents the number of sub-cackets in each type of packet, although the value M itself is not explicitly transmitted. Thus, in the third row of the table, two sub-packets of 10 octets each, representing encoding at 16 Kbit/sec, are transmitted in a single packet. If not for the ARF, this packet would be ambiguous with the example shown in the fourth row, is a single packet of 20 octets, representing encoding at 32 Kbit/sec. An additional octet is thus transmitted containing the ambiguity-resolving information, well as a CRC code. The actual ambiguity-resolving code used is shown here as a "1", but any suitable code may be used. The packet length is adjusted to take into account the ARF. Thus, the packet length for two G.726-16 sub-packets, grouped in one packet with the ARF, is 21.

TABLE I

ADPCM CODING USING ARF

| Packet length (octets) | Algorithm | M | ARF |
| --- | --- | --- | --- |
| 40 | Pulse code modulation (PCM), G.711-64, generic | 1 | — |
| 25 | ADPCM, G.726-40 | 1 | — |
| 21 | ADPCM, G.726-16 | 2 | 1 |
| 20 | ADPCM, G.726-32 | 1 | — |
| 15 | ADPCM, G.726-24 | 1 | — |
| 10 | ADPCM, G.726-16 | 1 | — |
| 1 | Generic silence insertion descriptor (SID) | 1 | — |

By way of comparison, it is noted that when the G.726-16 packet with a single 10-octet sub-packet is used, packet overhead is 30% (3 octet header/10 octet payload). When the dual 10-octet packet with the added ARF byte is used, the overhead is only 20% ((3 octet header+one octet ARF)/20 octet payload).

Table II below illustrates the use of ARF 68 to enable sub-packets of different sizes to be combined in a single packet, using LD-CELP coding, in accordance with another preferred embodiment of the present invention. Each of the packets in the table that corresponds to a new codepoint, based on the ARF, includes two different-sized sub-packets. The internal division of each such packet is defined unambiguously by its respective AREP value. Without the ARF, the order of the sub-packets would be unknown.

TABLE II

LD-CELP CODING USING ARF

| Packet length (octets) | Algorithm | M | ARF | Packet time (ms) |
|---|---|---|---|---|
| 40 | PCM, G.711-64, generic | 1 | | 5 |
| 20 | LD-CELP, G.728-16 | 2 | | 10 |
| 19 | LD-CELP, G.728-16; LD-CELP, G.728-12.8 (ARF) | 2 | 0 | 10 |
| 19 | LD-CELP, G.728-12.8; LD-CELP, G.723-16 (ARF) | 2 | 1 | 10 |
| 17 | LD-CELP, G.728-16; LD-CELP, G.728-9.6 (ARF) | 2 | 0 | 10 |
| 17 | LD-CELP, G.728-9.6; LD-CELP, G.723-16 (ARF) | 2 | 1 | 10 |
| 16 | LD-CELP, G.728-12.8 | 2 | 1 | 10 |
| 15 | LD-CELP, G.723-12.3; LD-CELP, G.723-9.6 (ARF) | 2 | 0 | 10 |
| 15 | LD-CELP, G.723-9.6; LD-CELP, G.723-12.3 (ARF) | 2 | 1 | 10 |
| 12 | LD-CELP, G.723-9.6 | 2 | | 10 |
| 10 | LD-CELP, G.723-16 | 1 | | 5 |
| 3 | LD-CELP, G.723-12.3 | 1 | | 5 |
| 6 | LD-CELP, G.723-9.6 | 1 | | 5 |
| 1 | Generic SID | 1 | | 5 |

Use of several sub-packet sizes within the same packet, as enabled by the use of ARF 68, increases the VRE control loop bandwidth, as described hereinabove, and thus the fidelity with which the VRE tracks changes in network conditions. As in Table I, it is noted here that the ARF adds minimal overhead, and can even be considered to reduce the total overhead by comparison with conventional schemes.

Table III illustrates an alternative embodiment of the present invention, wherein the ARF is used to enable packets to be encoded according to different encoding rules or algorithms. The ARF in this case identifies the encoding rules used for each of the packets, which would otherwise be ambiguous. This embodiment requires, however, that the receiver be capable of decoding all of the relevant algorithms in real time. Alternatively, the packets could contain sub-packets that are encoded according to different encoding rules.

TABLE III

MIXED ALGORITHM CODING USING ARF

| Packet length (octets) | Algorithm | M | ARF | Packet time (ms) |
|---|---|---|---|---|
| 40 | PCM, G.711-64, generic | 1 | | 5 |
| 21 | LD-CELP, G.728-16 (ARF) | 2 | 0 | 10 |
| 21 | CS-ACELP, G.729-8 (ARF) | 2 | 1 | 20 |
| 20 | ADPCM, G.726-32 | 1 | | 5 |
| 11 | LD-CELP, G.728-16 (ARF) | 1 | 0 | 5 |
| 10 | CS-ACELP, G.729-8 | 1 | | 10 |
| 2 | G.729 SID | 1 | 1 | 10 |

Although preferred embodiments are described herein with reference to ATM networks and network standards, it will be understood that the principles of the present invention may similarly be applied to improve transmission quality and efficient use of bandwidth in networks of other types. It will be appreciated that the red embodiments described above are cited by way of example, and the full scope of the invention is limited only the claims.

What is claimed is:

1. Variable-rate encoding apparatus operative to receive data and process the data for transmission through a network, comprising:

a processor, which determines a degree of circuit congestion responsive to the status of a cell queue associated with at least one virtual circuit of the network;

a variable-rate encoder, operative to encode the received data so as to provide encoded data packets to the at least one virtual circuit at rate that is selected responsive to said degree of circuit congestion; and a bit rate selector, wherein the apparatus is suitable for an asynchronous transfer mode (ATM) network; and wherein the processor determines a mean bit rate of the encoded data packets to be output by the encoder as a function of the circuit congestion, and wherein the bit rate selects one of a plurality of discrete, applicable bit rates of the encoder responsive to the mean bit rate.

2. Apparatus according to claim 1, wherein the degree of the circuit congestion is proportional to a ratio of an instantaneous fill level of said cell queue to a maximum fill level of said cell queue.

3. Apparatus according to claim 1, wherein each of the applicable bit rates is respectively associated with an output data packet length determined by an encoding standard according to which the encoder encodes the data.

4. Apparatus according to claim 1, wherein the mean bit rate determined for a minimum value of the circuit is less than a maximum of the applicable bit rates.

5. Apparatus according to claim 1, wherein for a given mean bit rate, the bit rate selector alternately selects at least two different ones of the applicable bit rates.

6. Apparatus according to claim 5, wherein the selection among the at least two different applicable bit rates is randomized.

7. Apparatus according to claim 1, wherein the rate at which the encoder encodes the data is selected responsive to an optimal average number of output bits per data sample, which is determined independently of the circuit congestion.

8. Apparatus according to claim 7 wherein the processor determines a desired bit rate of the encoded data packets to be output by encoder by comparing the mean bit rate determined as a function of the circuit congestion and an optimal bit rate determined as a function of the optimal average number of output bits per data sample.

9. Apparatus according to claim 1, wherein the apparatus generates ATM Adaptation Layer 2 Type-1 packets for transmission through the network, including a Type-1 packet in which two or more of the encoded data packets, differing in at least one defining characteristic, are combined.

10. Apparatus according to claim 9, wherein an ambiguity-resolving field is appended to at least one of the Type-1 packets so as to identify the characteristics of the encoded data packets combined therein.

11. A variable-rate encoding system for processing data received from multiple data sources for transmission an asynchronous transfer mode network, comprising:

a plurality of cell queues, which contain cells prepared for transmission through respective virtual circuits or virtual paths of the network and have respective queue fill levels which vary responsive to a level of network congestion; and one or more apparatus according to claim 1, respectively comprising one or more said variable-rate encoders, each of which provides encoded data packets to one of said cell queues after encoding the data at a rate that is varied responsive to the fill level of said one of said plurality of cell queues to which said encoder provides said encoded data packets, substantially independently of setting encoding rate of the other encoders.

12. Apparatus according to claim 9, wherein the different encoding characteristics comprise respective lengths of the encoded data packets.

13. Apparatus according to claim 12, wherein the Type-1 packet comprises two or more encoded data packets of different lengths.

14. Apparatus according to claim 12, wherein the different lengths are associated with respective, different encoding rates, which are selected from said plurality of discrete, applicable bit rate of the encoder.

15. Apparatus according to claim 9, wherein the different encoding characteristics comprise different encoding rules that are applied by the encoder.

16. A method for variable-rate encoding of data from a data source for transmission through a virtual circuit in a network, comprising:

encoding data from the source so as to provide encoded data packets to the virtual circuit at a variable output bit rate;

assessing the status of a cell queue associated with said virtual circuit so as to determine a degree of circuit congestion; and controlling the encoding, so as to set the output bit rate responsive to the degree of circuit congestion, comprising:

determining a mean bit rate of the encoded data packets to be output as a function of the circuit congestion; and selecting one of a plurality of discrete, applicable bit rates responsive to the mean bit rate, wherein the method is suitable for an asynchronous transfer mode (ATM) network.

17. A method according to claim 16, wherein said assessing the status of the cell queue comprises evaluating ratio of a fill level of the cell queue to a maximum fill level of said cell queue.

18. A method according to claim 16, wherein said selecting one of the applicable bit rates comprises selecting an output data packet length associated with the respective bit rate, as determined by an applicable encoding standard.

19. A method according to claim 16, wherein said determining a mean bit rate comprises setting a mean bit rate at a minimum value of the circuit congestion that is substantially setting less than a maximum of the applicable bit rates.

20. A method according to claim 16, wherein said selecting one of the applicable bit rates comprises, for a given mean bit rate, alternately selecting at least two different ones of the applicable bit rate.

21. A method according to claim 20, wherein said alternately selecting at least two different applicable bit rates comprises making a randomized selection.

22. A method according to claim 16, wherein said controlling the encoding comprises selecting a rate at which the data are encoded responsive independently of the circuit congestion.

23. A method for variable-rate encoding of data from a data source for transmission through a virtual circuit a network, comprising:

encoding data from the source se as to provide encoded data packets to the virtual circuit at a variable output bit rate;

assessing the status of a cell queue associated with said virtual circuit so as to determine a degree of circuit congestion; and controlling the encoding se as to set the output bit rate responsive to the degree of circuit congestion comprising:

selecting a rate at which the data are encoded responsive to an optimal average number of output bits per data sample, which is determined independently of the circuit congestion comprising:

selecting a rate based on comparing a measured mean bit rate and an optimal bit rate determined as a function of the optimal average number of output bits per data sample.

24. A method according to claim 16, and comprising combining two or more encoded data packets differing in at least one defining characteristic thereof into a single ATM Adaptation Layer 2 Type-1 packet for input to said virtual circuit.

25. A method according to claim 24, wherein said combining two or more encoded data packets comprises appending an ambiguity-resolving field to the Type-1 packet so as to identify the characteristics of the encoded data packets combined therein.

26. A method for variable-rate encoding of data from multiple data sources for transmission through a plurality of virtual circuits in a network, comprising:

assessing the status of a cell queue associated with each of said plurality of virtual circuits so as to determined a degree of circuit congestion;

encoding data from the multiple data sources so as to provide encoded data packets to the plurality of virtual circuits, each characterized by a respective circuit congestion dependent on congestion of the network, at a variable output bit rate; and controlling the encoding so as to set the output bit rate responsive to the degree of circuit congestion comprising:

varying an output bit rate of each of the sources substantially independently of the other sources.

27. A method according to claim 26, wherein said varying an output bit rate of each of the sources comprises varying a bit rate responsive to a fill level of a cell queue associated with a respective one of the virtual circuits to which the encoded data from the source are provided.

28. A method according to claim 24, wherein said encoding data comprises providing encoded data packets having different, respective lengths.

29. A method according to claim 28, wherein said combining two or more encoded data packets comprises combining packets of different lengths.

30. A method according to claim 24, wherein said encoding data comprises encoding data at different encoding rates, which are selected from said plurality of discrete, applicable bit rates of the encoder.

31. A method according to claim 24, wherein said encoding data comprises applying different encoding rules to the encoded data packets.

* * * * *